United States Patent
Kashiwamura et al.

[11] Patent Number: 5,692,727
[45] Date of Patent: Dec. 2, 1997

[54] SEAT DEVICE

[75] Inventors: Takayoshi Kashiwamura; Akira Homma; Nozomu Munemura, all of Yokohama; Toshimichi Hanai, Yokosuka; Kazuhito Kato, Yokohama; Kozo Yamaura, Fujisawa, all of Japan

[73] Assignees: NHK Spring Co., Ltd.; Nissan Motor Co., Ltd., both of Yokohama, Japan

[21] Appl. No.: 529,383

[22] Filed: Sep. 18, 1995

[30] Foreign Application Priority Data

Sep. 19, 1994 [JP] Japan .................. 6-250014

[51] Int. Cl.$^6$ ......................................... B60N 2/00
[52] U.S. Cl. .............. 248/608; 297/300.4; 267/154; 267/133
[58] Field of Search .................. 248/608, 618, 248/580, 421; 297/300.4, 154, 273, 143, 131, 133

[56] References Cited

U.S. PATENT DOCUMENTS

| | | | |
|---|---|---|---|
| 195,888 | 10/1877 | Dudley | 248/608 X |
| 2,195,507 | 4/1940 | Best | 248/421 X |
| 2,638,965 | 5/1953 | Woodin | 248/580 |
| 2,768,674 | 10/1956 | Phenix | 248/618 X |
| 2,812,009 | 11/1957 | Skirvin | 248/618 X |
| 3,090,586 | 5/1963 | Schwegler et al. | 248/608 X |
| 5,172,955 | 12/1992 | Freese et al. | 248/608 X |

Primary Examiner—Alvin C. Chin-Shue
Assistant Examiner—Long Dinh Phan
Attorney, Agent, or Firm—Keck, Mahin & Cate

[57] ABSTRACT

A supporting member in a conventional seat device is supported only by torsion bar arm portions positioned at right and left sides of the device. Accordingly, when a large biased load acts on the device, a sufficient roll rigidity is not obtained and both arm portions at the right and left sides rotate simultaneously. Interference with the supporting panel, cushion frame or the like may also occur. Accordingly, a seat pad supporting member supported by a cushion frame provided on a floor is elastically supported on at least one of the front and rear portions thereof to a torsion frame by a torsion bar. The torsion bar is latched, at the torsion bar torque bar portion side, to the cushion frame side. The torsion arm portion side, moreover, is latched to the right and left sides. Finally, the torsion bar arm portion, on both sides, is connected to a connecting member.

5 Claims, 8 Drawing Sheets

SEAT DEVICE

BACKGROUND OF THE INVENTION

This invention relates to a seat device for cars or the like in which seat pad supporting means is elastically supported to a cushion frame by torsion bars.

Japanese patent publication no. Heisei 4-200410 disclose a seat device in which a supporting panel is elastically supported to a seat cushion frame by torsion bars.

This seat device is, as shown in FIG. 13 and FIG. 14 provided with a rectangular seat cushion frame 26 mounted on a floor, a supporting panel 21 which is supported to said cushion frame 26, and a seat portion which is supported to said supporting panel 21 and said seat cushion frame 26. Front and rear ends of said supporting panel 21 are connected to said seat cushion frame 26 by two torsion bars 22, 23 and 24, 25, respectively.

The ends of torque bar portions "a" of each of said torsion bars 22, 23, 24, 25 are connected to said cushion frame 26, and ends of said torsion bars are connected to sides of said supporting panel 21 at arm portions "b" of the torsion bars.

In other words, said torsion bars 22, 23, 24, 25 are provided with attached portions 22a, 23a, 24a, 25a to be fixed to said seat cushion frame 26 at first ends (torque bar portion "a"). At second ends (of the torque bar portion "a") the torsion bars are provided with arm portions 22b, 23b, 24b, 25b to be fixed at said supporting panel 21. The arm portions 22b, 23b, and 24b, 25b are formed so as to be able to vertically deflect with respect to said torque bar portion "a" (attaching portions 22a, 23b, 24c, 25d).

A plurality of ribs 21a which stretch in the transverse direction is provided. The ribs are provided at suitable intervals in front and rear directions on said supporting panel 21. The supporting panel 21 is provided with bending elasticity in front and rear directions and a bending rigidity in the transverse direction.

Thus, the supporting panel 21 is connected to the seat cushion frame 26 by the front torsion bars 22 and 23 and the rear torsion bars 24 and 25 so as to be supported by the seat cushion frame 26.

Accordingly, the front portion of the supporting panel 21 can move vertically with respect to the cushion frame 26 by the action of the front torsion bars 22 and 23. In addition, the rear portion of the supporting panel 21 can be moved vertically with respect to the seat cushion frame 26 by the action of the rear torsion bars 24 and 25.

However, in said conventional seat device, at least one of the front and rear ends of the supporting panel 21 is connected to the seat cushion frame 26 by at least two of the torsion bars 22, 23 and 24, 25. The torsion bars 22, 23, 24, 25 each have one end of the "b" sides of the torque bar portions thereof latched to the seat cushion frame 26 side and another end of the "b" side of the arm portion latched to the right and left sides of the supporting panel 21. The following problems arise.

(1) When at least one end of the front and rear ends of the supporting panel 21 is connected to the seat cushion frame 26 by at least two of the torsion bars 22, 23 and 24, 25, these two torsion bars 22, 23 or 24, 25 do not always give synchronous turns to both the supporting panel and the seat cushion frame.

(2) Since the supporting panel 21 is only supported by the torsion bar arm portions "b" positioned at right and left sides thereof, a displacement of the torsion bar arm portions "b", such as falling down in the right and left direction or the like, may occur and a sufficient roll rigidity might not be obtained when a large loading is applied.

(3) When the torsion bars 22, 23, 24, 25 do not give a synchronous turn to the supporting panel and the seat frame, or the displacement occurs in the right or left directions, a feeling of smooth deflection cannot be obtained when one is seated.

(4) When the torsion bar arm portion "b" displaces in the right or left direction, rubbing against the supporting panel 21 occurs near the attached portion of said supporting panel 21, which may upset vibration control mechanisms.

This invention is provided after identifying such conventional problems and its object is to overcome said problems by connecting the torsion bar arms on both sides with a connecting member.

SUMMARY OF THE INVENTION

The inventors of the present invention have found that the above problems can be resolved when the seat pad supporting member supported by the cushion frame mounted on a floor is elastically supported on the cushion frame at at least one end of the front and rear portions thereof, by the torsion bar. The torque bar portion of the torsion bar latches to the cushion frame, and an arm portion of the torsion bar latches to the seat pad supporting member at its left and right sides. Arm portions of both torsion bars are connected by connecting members.

The connecting member and arm portion of the torsion bar are connected with a restrainable connecting means so that movement of the torsion bar in the circumferential direction of the arm and in the axial direction is available.

The connecting means which restrains the movement of the arm portion in the circumferential direction connects two non-parallel sides near the connected member ends and the torsion bar•arm portion.

Further, a means which restrains the movement of the arm portion in the axial direction has a bending portion at the arm portion of the torsion bar.

Furthermore, the bending portion at the arm portion of the above torsion bar is provided in the arm-rotation direction.

Still further, the bending portion at the arm portion of the above torsion bar is provided on a plane oriented in the same direction as the connecting member.

Still further, in addition to the bending portion at the torsion bar•arm portion, a similar bending portion is provided at both end bending portions of the connecting member.

The connecting means is an integrally formed clip.

In the present invention, the torque bar portion of the torsion bar is latched to the cushion frame, the arm portion of the torsion bar is latched to both right and left sides of the seat pad supporting member, and the arm portions of the torsion bar, on both the right and left sides, are connected by a connecting member.

Accordingly, the roll rigidity of the torsion bar •arm portions on the right and left sides becomes high, and synchronous rotation of the torsion bars is available. In addition, displacement of the torsion bar•arm portion in the right and left directions is also prevented. In other words, even if a biased load in the right or left direction acts on a supporting panel as the supporting member due to the movement of a seated person's weight and deflects the torsion bar on which the load primarily acts, this action is transmitted to the torsion bar•arm portion at an opposite side through the connecting member thereby increasing the roll rigidity of the seat surface so as to secure a simultaneous pivot. It is possible in this way to securely prevent the swinging.

In addition, the torsion bars rotate simultaneously and do not displace in the right or left directions, and comfortable seating with a good roll rigidity can be obtained.

Further, since the torsion bar·arm portion does not displace in the right or left direction, rubbing against the supporting panel does not occur and the vibrating characteristics are also good.

The connecting member and the torsion bar arm are connected by a connecting means which is able to restrain the movement in the arm portion circumferential direction and the axial direction. The movement of the connecting member in the axial direction of the arm portion and the movement in the right or left direction due to the rotation in the arm portion circumferential direction together with connecting means do not occur. Also the increase of a play between the torsion bar and the connecting member due to the above movements and the like do not occur. The decrease of the transmission of the force also does not occur.

Thus, the connecting member of the present invention provides the advantages explained above.

When the connecting means is one which connects the two non-parallel sides near the end portion of the connecting member and the arm portion of the torsion bar, the rotation around the arm portion axis of the connecting means itself is controlled. Accordingly, movement in the right or left direction of the connecting member can be prevented.

When the arm portion of the torsion bar is provided with the bending portion, the connecting member restrains the movement of the arm portion in the axial direction. By this, the amount of the displacement of the arm portion is large and, accordingly, the connecting member can be always placed near an end portion where a displacement difference of both arm portions is large. Consequently a displacement difference of both arm portions can be kept small. As a result, swinging of the seat panel can be prevented.

When the bending portion of said torsion bar·arm portion is provided in the arm rotation direction or on the plane in the same direction as the connecting member, the same effect results.

Further, when said connecting means is a clip formed integrally, the connection of the torsion bar·arm portion with the connecting member becomes easy.

DETAILED DESCRIPTION OF THE PREFERRED EMBODIMENTS

The embodiments of this invention will be described as follows together with the drawings.

Embodiment 1

Figure 1:
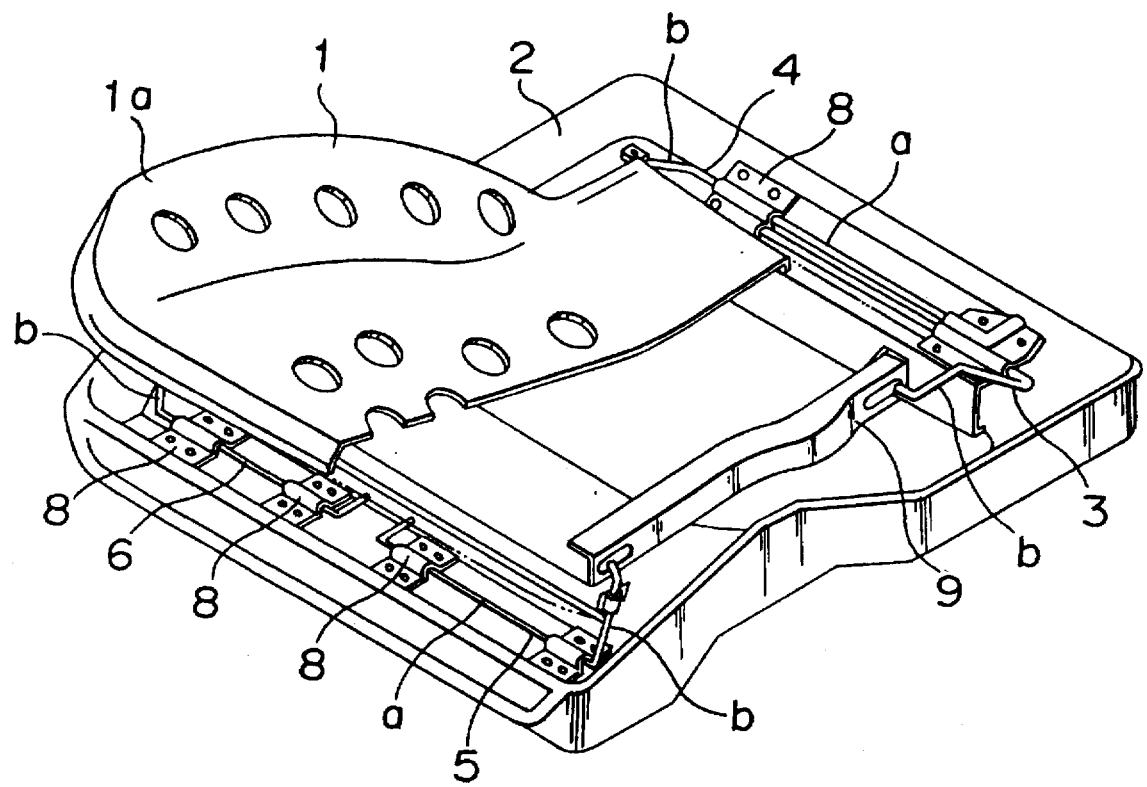
FIG. 1 is a partly sectional perspective view which shows a first embodiment of this invention.
Figure 2:
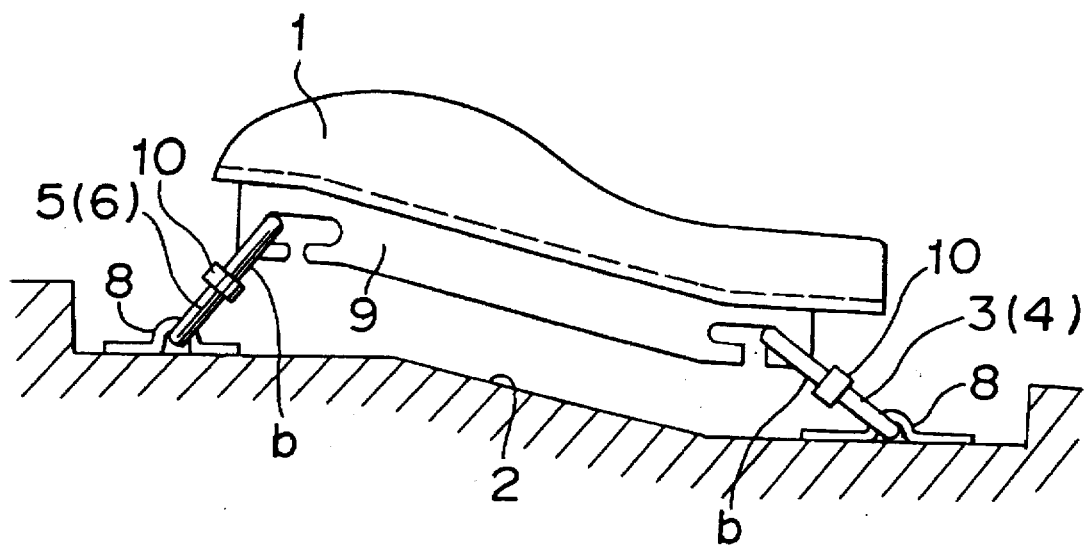
FIG. 2 is a side view of the first embodiment of this invention.
Figure 3:
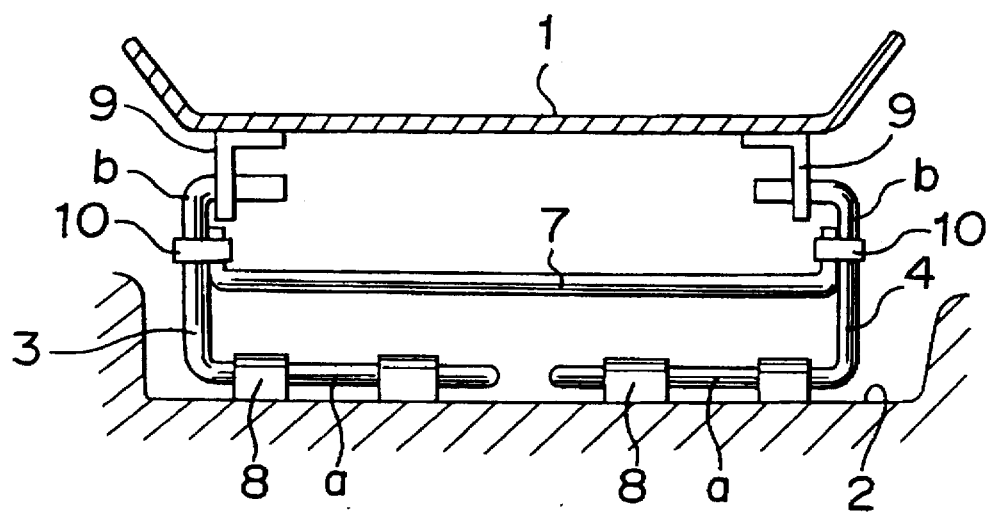
FIG. 3 is a front view of a material portion of the first embodiment of this invention.

FIG. 1, FIG. 2 and FIG. 3 show a seat device according to this invention. FIG. 1 is a partial sectional perspective view, FIG. 2 is a side view and FIG. 3 is a front view of the device.

In said drawings, the seat device according to this invention is constituted by a supporting panel 1 as a supporting member which supports the seat pad and torsion bars 3, 4, 5, 6 which support said supporting panel 1 to the cushion frame 2 elastically.

The supporting panel 1 as a supporting member is formed by a supporting body having a concave form in the middle portion and forming banks 1a at both sides thereof.

The torsion bars 3, 4, 5, 6 are provided between said cushion frame 2 and the supporting panel 1. Each torsion bar·torque bar portion "a" side, which is one end thereof, is attached to the cushion frame 2 by a bracket 8. Each torsion bar·arm portion "b", which is another end side thereof, is attached to one of the right and left sides of the supporting panel 1 through a bracket 9. These torsion bars 3, 4, 5, 6 are arranged with two torsion bars 3, 4 and 5, 6 at the front and rear, respectively, as shown in FIG. 1. The torsion bars 3, 4 and 5, 6 at left and right sides are respectively supported by the floor.

The arm portions (between b and b) at both right and left sides of said torsion bars 3, 4, 5, 6 are connected by connecting members, respectively. Each connecting member 7 increases the roll rigidity between arm portions b—b at both the right and left sides thereby securing a simultaneous rotation of both torsion bars.

Since the part of the arm portions b and b of the torsion bars is connected by the connecting member 7, the roll rigidity of the part of the arm portion at the right and left sides increases, whereby synchronous rotation of the torsion bars can be securely obtained. Further, the displacement of the arm portion "b" in the right or left direction is also prevented. Accordingly, an excellent seated feeling is provided.

Furthermore, since the torsion bar·arm portion "b" does not displace in the right and left directions, this portion does not rub against supporting panel 1 and the vibration characteristics become better.

Still further, the two torsion bars 3, 4 shown in FIG. 1 can be formed integrally.

Embodiment 2

Figure 4:
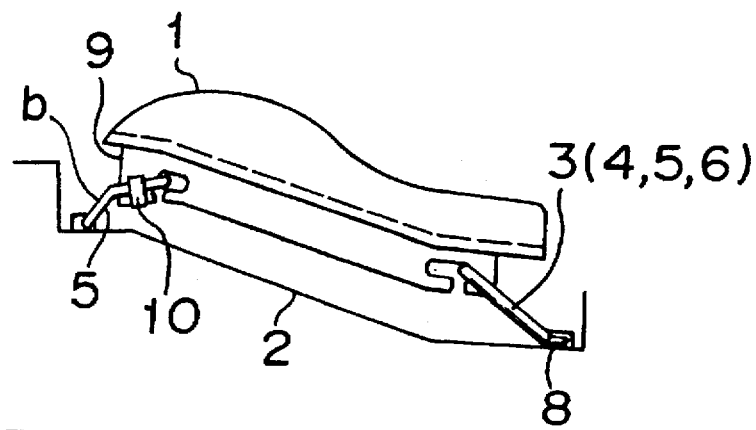
FIG. 4 is a side view which shows a second embodiment of this invention.
Figure 5:
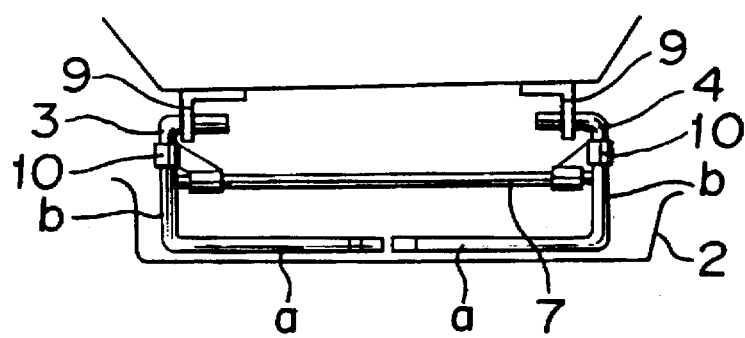
FIG. 5 is a front view of a material portion of the second embodiment of this invention.
Figure 6:
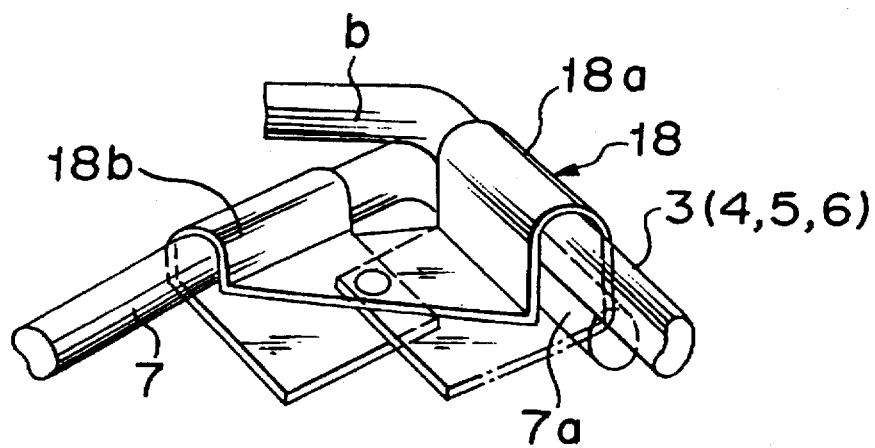
FIG. 6 is a perspective view which shows a latching clip as a connecting means according to this invention.
Figure 7:
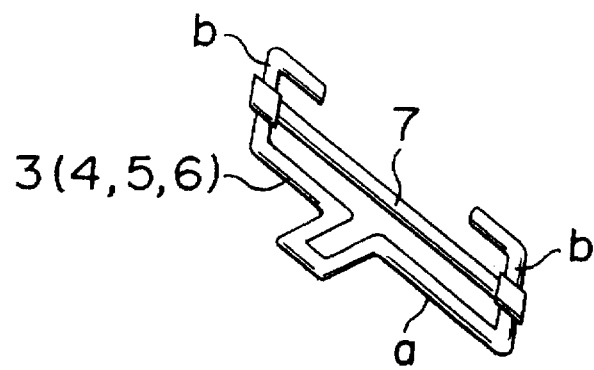
FIG. 7 is a perspective view which shows another embodiment of the torsion bar.

FIG. 4 to FIG. 6 represent the second embodiment of this invention. In this invention, a "<-shaped" bending portion in the rotation direction of the arm portion "b" is provided near the middle portion of the torsion bar•arm portion "b". Both ends of the connecting member 7 are also bent to form shapes approximating the letter L. The connecting member 7 is connected to the arm portion by connecting the bending portion 7a thereof with the bending portion of the arm portion "b" by a connecting means 10.

FIG. 6 shows a connecting portion of the arm portion "b" of the torsion bar 3, 4, 5, 6 with the connecting portion of the connecting member 7. A latching clip 18 is shown as a connecting means 10.

The latching clip 18 has a plate body and a first clip portion 18a and a second clip portion 18b formed at fixed angles. The first clip portion 18a is a portion which clips the arm portion "b" of the torsion bars 3, 4, 5, 6 and portions which clips the bending portion 7a of the connecting member 7, and the second clip portion 18b is a portion which clips the connecting member 7. In other words, although the torsion bar•arm portion and the connecting member 7 are connected with a latching clip 18, the connecting member 7 latches the main body and two adjacent sides (non-parallel sides) of the bending portion 7a.

Figure 8:
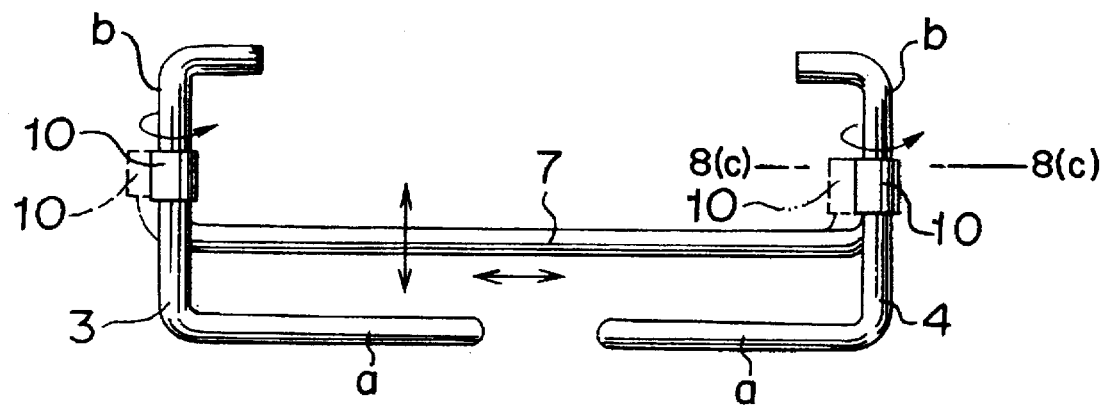
FIGS. 8(A) and 8(B) are a front view and a plan view, respectively which show the torsion bar, and FIG. 8(C) a sectional view along line 8(C)—8(C) of FIG. 8(A).
Figure 8:
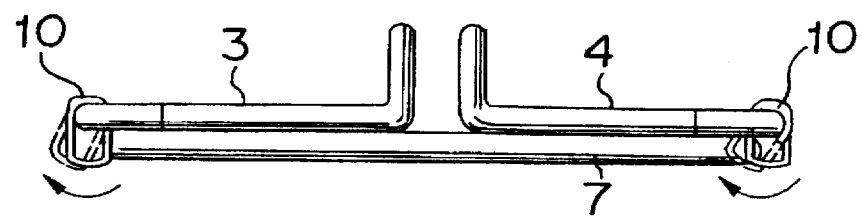
Figure 8:
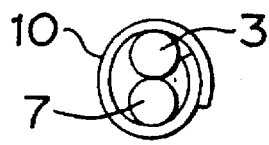

When a biased load in the right or left direction is applied to the supporting panel 1 by movement of a seated person's body weight at the time of getting on and off or by a turn of the automobile, even if the torsion bar on which the load acts on a larger scale deflects, this action is transmitted to the torsion bar arm portion "b" at the opposite side through the connecting member 7 to increase the roll rigidity of the seat surface thereby securely enabling swing prevention. However, when the restriction force of the latching clip 18 is insufficient, the connecting member 7 moves in the right and left directions by movement of the connecting member 7 in the axial direction of the arm portion "b" or movement in the right or left direction by the rotation around the axis of the arm portion "b" together with latching clip 18 as shown in FIG. 8; The play of the torsion bars 3, 4, 5, 6 and the connecting member 7 increases to decrease the transmission of force, thereby preventing sufficient roll rigidity and decreasing the preventive effect of the swing. However, when two sides of the connecting member 7 are fixed by the integrally formed latching clip 18 formed as shown in FIG. 6, since rotation around the "b" axis of the arm portion of the latching clip 18 is restrained, the movement of the connecting member in the right or left directions can be prevented. Further, the movement of the connecting member 7 in the axial direction of the arm portion "b" can be prevented by the "<-shaped" bending portion provided at arm portion b. Accordingly, the amount of displacement of the arm portion b is large, and arrangement of the connecting member near the end portion where a displacement difference of the right and left arm portions b, b appears to be large is always possible. This enables prevention of swinging of the seat surface panel effectively so as to keep the displacement difference of both arm portions b, b small.

Embodiment 3

Figure 9:
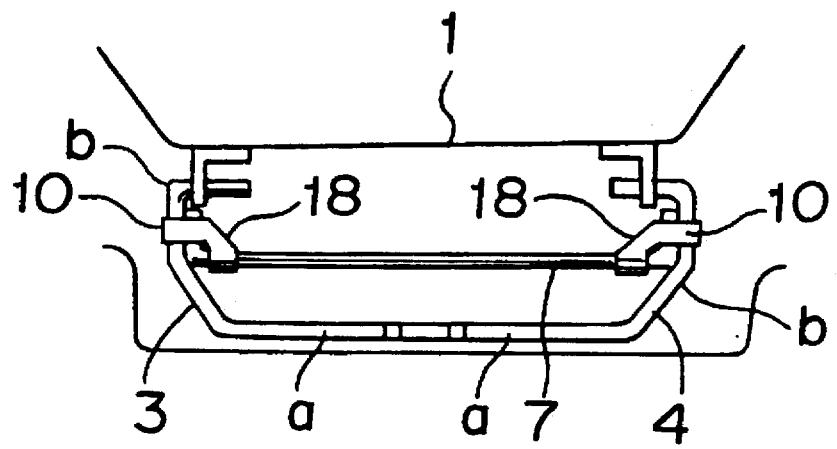
FIGS. 9(A) and 9(B) are a front view and a partial side view, respectively which show a third embodiment of this invention.
Figure 9:
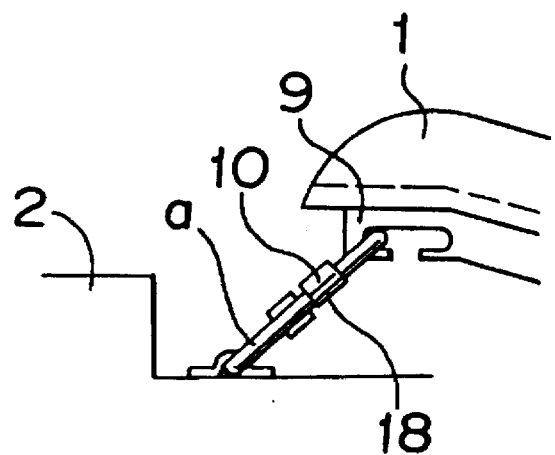

FIGS. 9A and 9B represent the third embodiment of this embodiment. This invention has a construction wherein a "<-shape" bending is provided at the torsion of the arm portions "b" of the torsion bars 3, 4, 5, 6 in the same plane as the connecting member 7, not in the rotation direction of the arm portion "b", but in the vertical direction thereof.

Other element are the same those of embodiment 1. In this construction, the same action as in embodiment 2 is performed.

Embodiment 4

Figure 10:
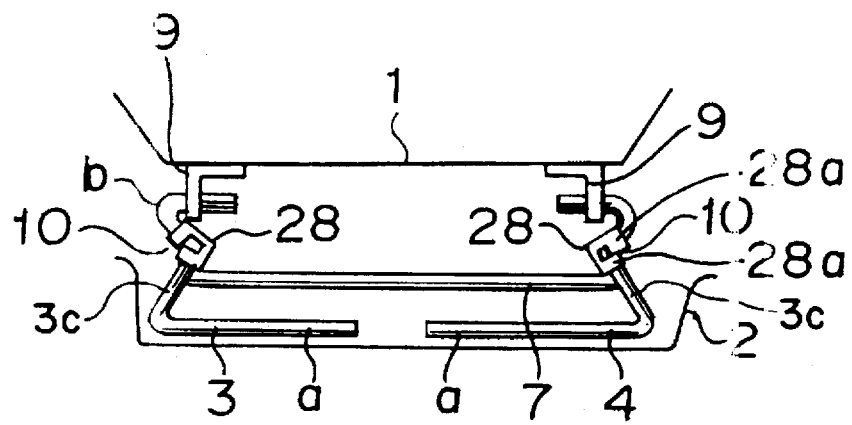
FIGS. 10(A) and 10(B) are a front view and a partial side view, respectfully which show a fourth embodiment of this invention.
Figure 10:
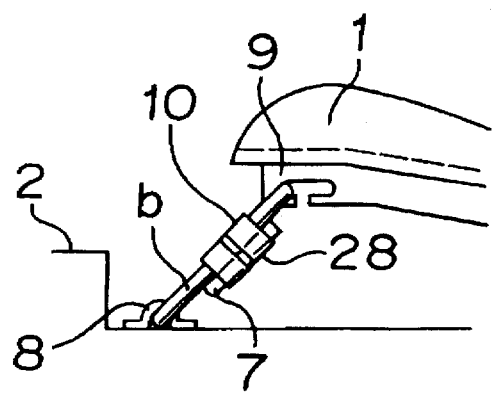
Figure 11:
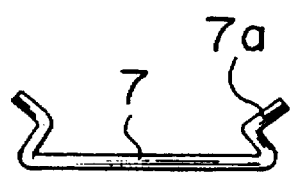
FIG. 11 is a view of the connecting member according the forth embodiment.

FIGS. 10A and 10B show the fourth embodiment of this invention. In this embodiment, although the arm portion "b" of the torsion bars 3, 4, 5, 6 is provided with a "<-shaped" bending portion in the rotative direction, the connecting member 7 is also provided with a "<-shape" having the same form at both ends of the bending portion 7a as shown in FIG. 11 and has a construction which fixes the torsion bar•arm portion "b" and the connecting member 7 at two positions which clip this bending portion.

The latching clip 28 in this example has a clip portion 28a formed so as to clip the torsion bar•arm portion 3c and the connecting member at two positions which clip this bending portion. Other elements are the same as those embodiment 2.

The rotation is restrained by the rotation around the arm portion "b" axis due to the rotation of the latching clip 28 itself.

Embodiment 5

Figure 12:
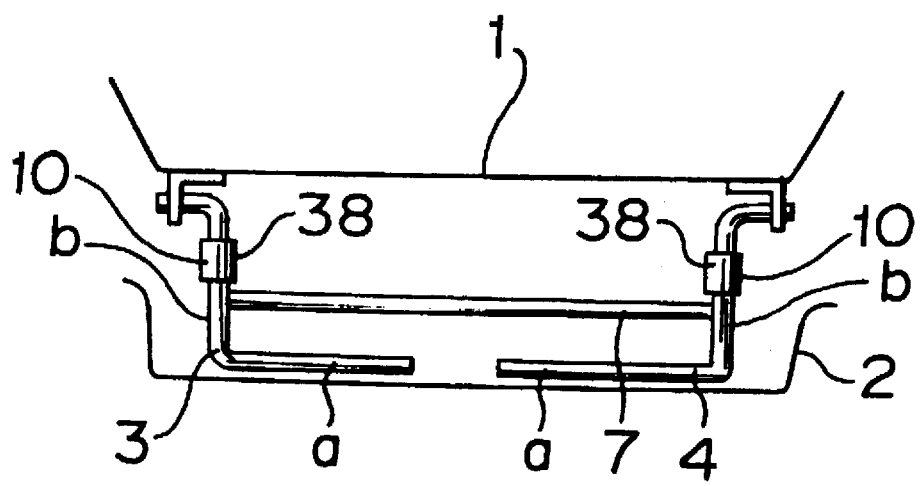
FIGS. 12(A) and 12(B) are a front view and a partial side view, respectfully which show a fifth embodiment of this invention.
Figure 12:
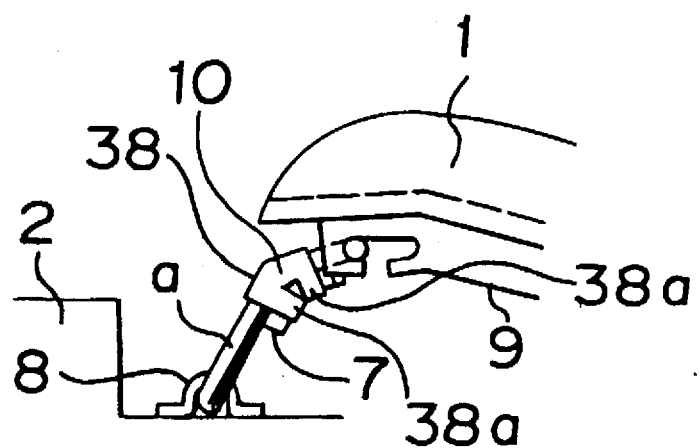
Figure 13:
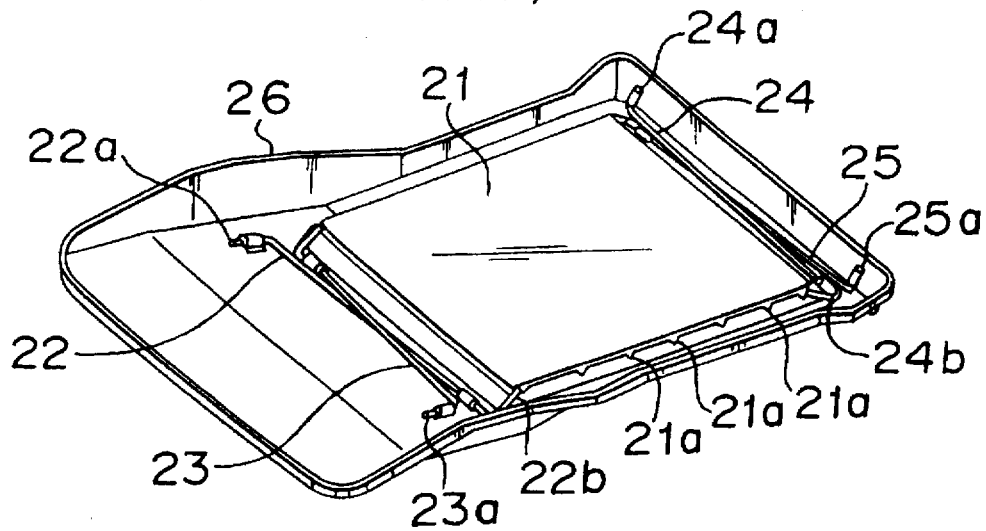
FIG. 13 is a perspective view of a conventional seat device.
Figure 14:
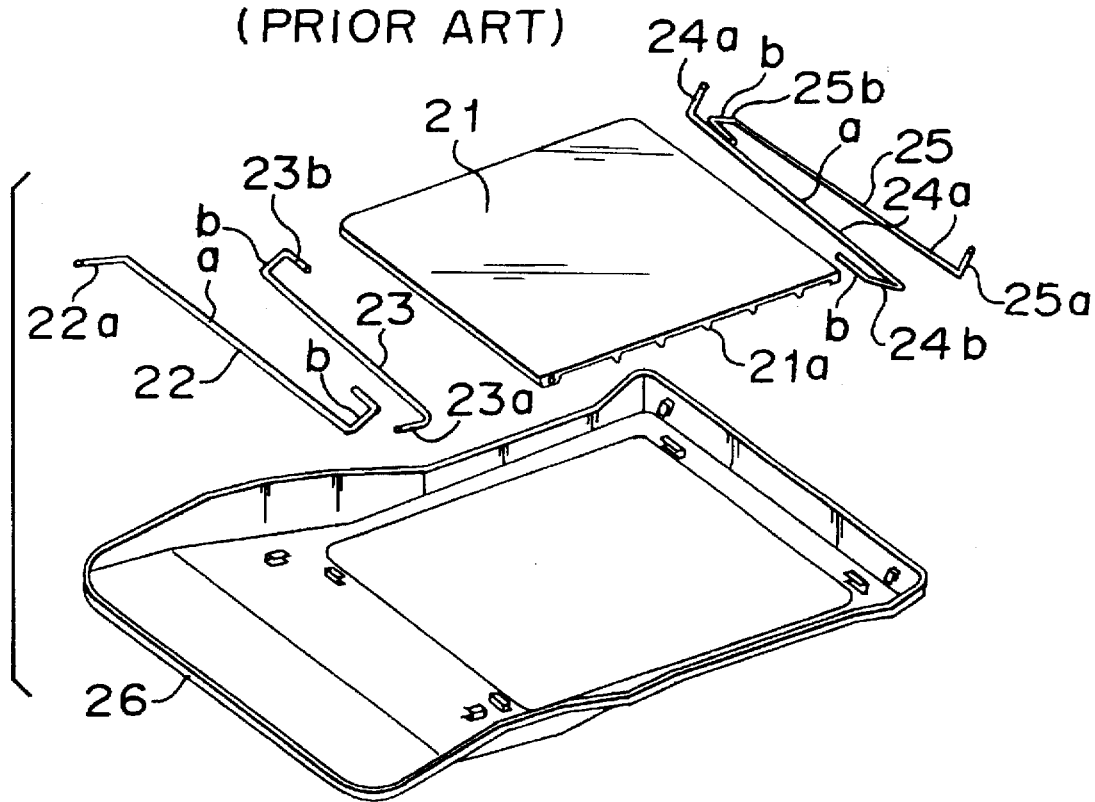
FIG. 14 is an exploded perspective view of the conventional seat device.

FIGS. 12A and 12B show the fifth embodiment. This embodiment is provided with a "<-shaped" bending portion in the vertical direction with respect to the rotation direction at the arm portion b of the torsion bars 3, 4, 5, 6 and the connecting member 7 is provided with the same bending portion at both ends of the bending portion 7a. These bending portions abut each other so as to be fixed with a latching clip 38.

In this example, the latching clip 38 also forms a clip portion 38a corresponding to the bending portion form. Other elements are the same as those of embodiment 2 and have the same action as those of embodiment 2 when operated. However, in this embodiment, the arm portion "b" side end portion of the torsion bars 3, 4, 5, 6 are especially bent toward the outside. A wider attaching span in the right and left directions to the supporting panel 1 can be provided. Accordingly, the roll rigidity of the panel can be increased whereby swing prevention becomes more effective.

Any connecting means 10, is appropriate as long as it is able to restrain not only the movement of the connecting member 7 in the axial direction with respect to the torsion bar•arm portion "b", but also movement in the circumferential direction.

When the connecting means 10 is in the form of any of the integrally formed latching clips 18, 28 and 38, the provision of strength is easy and a sufficient roll rigidity can be obtained. Consequently, such advantages as secure swing prevention, easy connecting, and a smooth installation are obtained.

Further, the connecting member can be provided not only between the torsion bar•arm portion, but also between a torsion bar•arm portion and another torsion bar•torque bar portion so as to bridge the portions obliquely.

As described above in detail, in this invention, since the seat pad supporting member supported by the cushion frame set on the floor is elastically supported at least one end of the front and rear ends thereof to the cushion frame by the torsion bar, the torsion bar is latched at the torsion bar•torque bar portion side to the cushion frame side, the torsion bar•arm portion side is attached to both right and left sides of the seat pad supporting member, and arm portions of the torsion bars at both sides thereof are connected by the connected member. The roll rigidity of the arm portions on both sides of the right and left sides is increased to secure the rotation simultaneously, thereby preventing displacement of the arm portion in the right and left directions.

In other words, a biased load acting in the right or left direction is charged to the supporting panel by the movement of a seated person's body weight. Even if a torsion bar to which a heavier load is charged tends to be deflected greatly, this action is transmitted to the torsion bar arm portion on the opposite side by the connecting member. Therefore the roll rigidity of the seat surface increases to securely prevent the swing.

When the connecting member and the torsion bar•arm portion are connected with a connecting means which restrains not only the movement of the connecting member in the axial direction with respect to the torsion bar•arm portion but also the movement in the circumferential direction, the movement of the connecting member in the axial direction of the arm portion, the movement of the arm portion, in the right and left directions by the rotation in the circumferential direction of the arm portion together with the connecting means, and the decrease of a force transmission, due to the increase of the play between the torsion bar and the connecting member by the removement of said connecting member and the like, disappear.

Accordingly, the effect of the connecting member becomes secure and the effect described above is more secure.

When the connecting means is one which connects the two non-parallel sides near the end portion of the connecting member and the torsion bar•arm portion, rotation around the axial circumference of the arm portion of the connecting mans itself is restrained. Therefore, movement in the right and left directions of the connecting member can be prevented.

When the bending portion is provided at the arm portion of the torsion bar, the connecting member restrains the movement in the axial direction of the arm portion. By this, the amount of displacement of the arm portion becomes large, and the connecting member can be always arranged near the end portion where the displacement difference of the arm portion of the right and left sides appears larger. The displacement of both arm portions, therefore, is kept smaller. As a result, swinging of the seat surface panel can be prevented.

Even if the bending portion of said torsion bar•arm portion is provided either in the arm rotation direction or on the plane in the same direction as the connecting member, the same effect is obtained.

When both the bending portion at the torsion bar•arm portion and the rotation in the axial circumferential direction of the arm portion of the connecting member are restrained, the movement in the right or left direction of the connecting member can be prevented. Further, when the side end portion of the torsion bar•arm portion is bent to the outside, since the attached span of the support in the right and left directions can be made wide, the rigidity of the roll is increased whereby vibration is more effectively prevented.

When the connecting means is a latching clip formed integrally, the movement of the connecting member in the circumferential direction and in the axial direction with respect to the torsion bar•arm portion can be restrained securely. The effect of the connecting member is sufficiently drawn and swinging due to the lack of rigidity in the roll direction can be effectively prevented.

In addition, the connecting operation is also easy.

What is claimed is:

1. A seat device comprising:

a support panel for supporting a seat pad, at least one pair of torsion bars arranged so as to oppose each other and elastically support said support panel, each of said torsion bars having a torque bar portion and an arm portion integrally formed in one piece, a cushion frame on which each torque bar portion is placed, brackets provided under said support panel and engaging with each arm portion, a connecting member extending between said at least one pair of torsion bars, and latching devices interconnecting each connecting member with each arm portion of the at least one pair of torsion bars so as to regulate circumferential and axial movements of each arm portion.

2. A seat device as claimed in claim 1, and further comprising a pair of bent portions provided at ends of said connecting member, said latching devices regulating circumferential movement thereof against each said arm portion, each of said latching devices including a first clip portion and a second clip portion, the first clip portion clipping to one of said arm portions and one of said bent portions, the second clip portion clipping to said connecting member itself.

3. A seat device as claimed in claim 1, and further comprising a bend provided in each arm portion for regulating axial movement of said connecting member against said arm portion, a pair of bent portions on ends of said connecting member, and a latching clip clipping each arm portion to said connecting member.

4. A seat device as claimed in claim 3 wherein each bend is provided in an arm rotation direction.

5. A seat device as claimed in claim 3 wherein each bend is provided laterally in one of said arm portion.

* * * * *